United States Patent [19]
Okubo et al.

[11] Patent Number: 6,011,930
[45] Date of Patent: Jan. 4, 2000

[54] CAMERA

[75] Inventors: Mitsumasa Okubo, Hino; Yoshiaki Kobayashi, Hachioji, both of Japan

[73] Assignee: Olympus Optical Co., Ltd., Tokyo, Japan

[21] Appl. No.: 09/061,095

[22] Filed: Apr. 16, 1998

[30] Foreign Application Priority Data

Apr. 17, 1997 [JP] Japan .................. H9-100548

[51] Int. Cl.[7] ........................................ G03B 17/24

[52] U.S. Cl. ............................. 396/296; 396/301

[58] Field of Search ........................ 396/281, 282, 396/287, 290, 291, 292, 296, 301, 303, 435, 436

[56] References Cited

U.S. PATENT DOCUMENTS 5,778,266  7/1998  Wakabayashi ................. 396/301

FOREIGN PATENT DOCUMENTS 3-85538  1/1991  Japan .

*Primary Examiner*—David M. Gray
*Attorney, Agent, or Firm*—Pillsbury Madison & Sutro LLP

[57] ABSTRACT

A camera of the present invention comprises: a liquid-crystal display device; a control circuit for controlling a sequence of operations performed by the camera; a first power circuit for maintaining a first voltage necessary to operate the control circuit; and a second power circuit having a boosting function for maintaining a second voltage that is higher than the first voltage and necessary to drive the liquid-crystal display device.

14 Claims, 13 Drawing Sheets

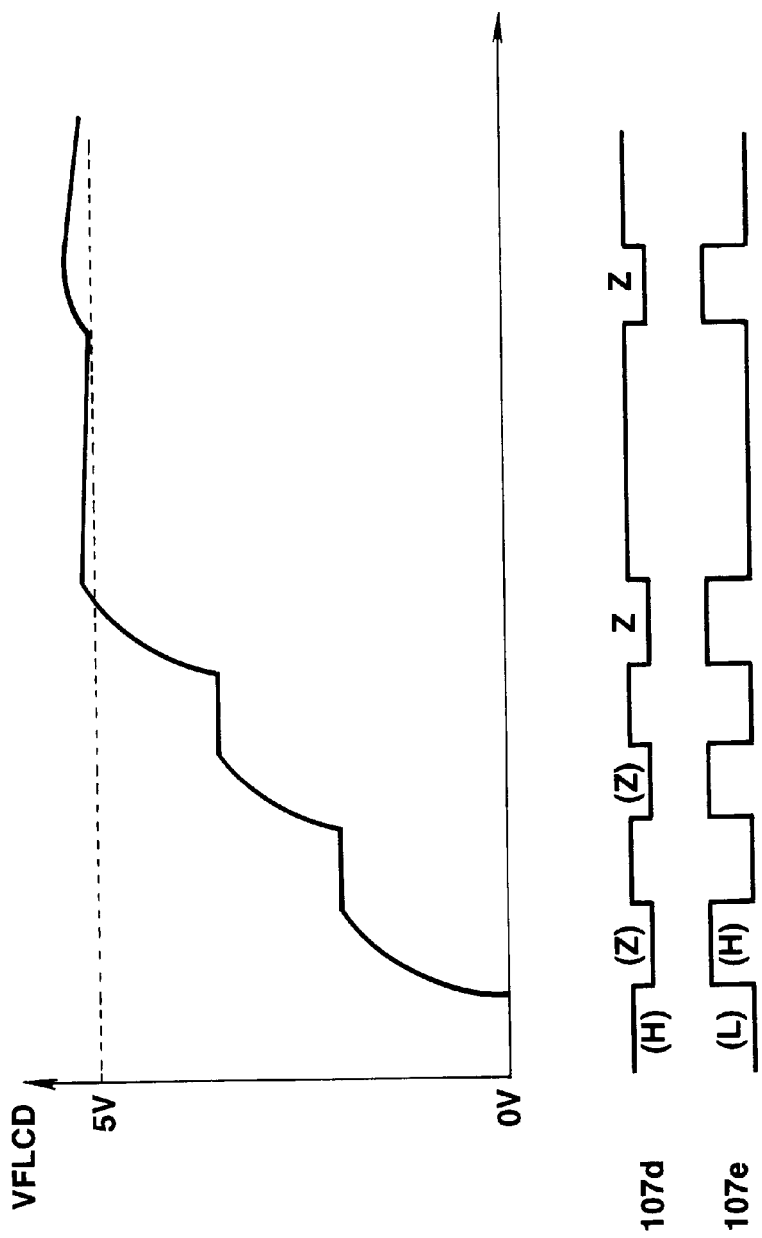

CAMERA

BACKGROUND OF THE INVENTION

1. Field of the Invention

The present invention relates, particularly, to a camera for displaying information by utilizing a guest-host type liquid crystal or the like.

2. Description of the Related Art

Currently, various kinds of liquid-crystal devices including a transmission liquid-crystal device for displaying information within a viewfinder are known. For example, Japanese Unexamined Patent Publication No. 3-85538 has disclosed a technological means for statically driving a transmission liquid crystal used to display information within a viewfinder.

For the transmission liquid crystal, unlike for a non-transmission liquid crystal, efforts must be made to attain a sufficient display density. Specifically, a driving mode (static driving, dynamic driving, or the like) must be determined, and a driving voltage and driving frequency must be taken into account. In the above disclosed example, a transmission liquid crystal used to display information within a viewfinder is driven statically. As far as cameras using a battery for providing about 3 V, which have increased in recent years, are concerned, unless the voltage of 3 V is boosted to about 5 V, the display density is insufficient or becomes irregular, or any other drawback occurs.

As a means for resolving this drawback, a method of boosting all voltages supplied from a power supply for a control circuit is conceivable. However, a current consumed by the control circuit system increases. Especially, when an attempt is made to display information within a viewfinder in a power-saving state, the exhaustion of the battery becomes outstanding. This is also a drawback.

OBJECTS AND SUMMARY OF THE INVENTION

The first object of the present invention is to provide a camera having a simple configuration using a liquid crystal, and achieving high-definition display of information while ensuring low cost and power saving.

Briefly, a camera in accordance with the present invention comprises: a liquid-crystal display device; a control circuit for controlling a sequence of operations performed by the camera; a first power circuit for maintaining a first voltage necessary to operate the control circuit; and a second power circuit having a boosting function for maintaining a second voltage that is higher than the first voltage and necessary to drive the liquid-crystal display device.

These objects and advantages of the present invention will become further apparent from the following detailed explanation.

BRIEF DESCRIPTION OF THE DRAWINGS

FIG. 18 is an explanatory diagram showing the characteristic of a voltage VFLCD to be boosted in the fourth embodiment.

DESCRIPTION OF THE PREFERRED EMBODIMENTS

Figure 1:
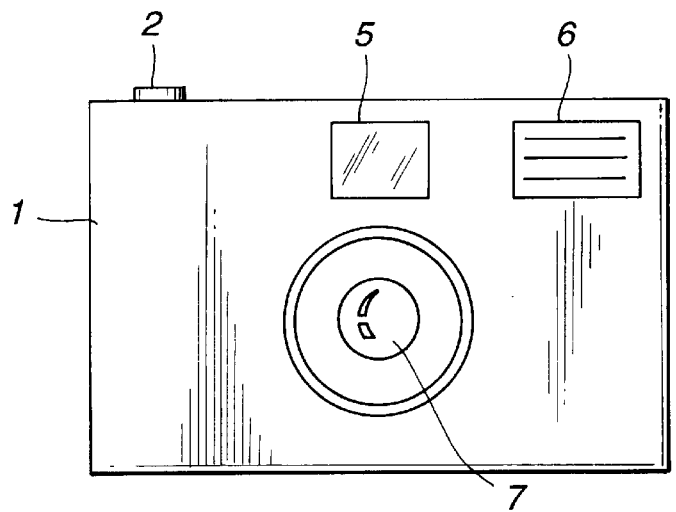
FIG. 1 is a front view of a camera of the first embodiment of the present invention.

Referring to the drawings, embodiments of the present invention will be described.

Figure 2:
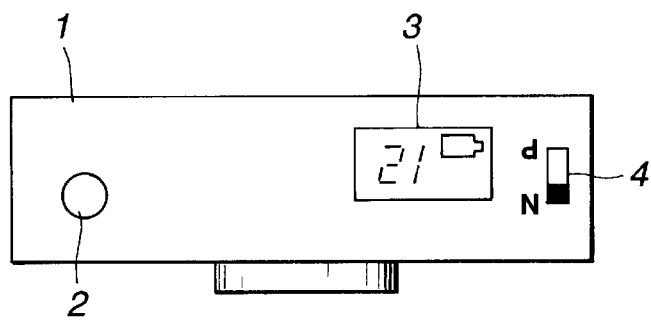
FIG. 2 is a top view of the camera of the first embodiment.

FIG. 1 is a front view of a camera of the first embodiment of the present invention, and FIG. 2 is a top view of the camera.

The camera of this embodiment has a release button 2 located on one side on the top of a camera body 1, and has an external display liquid crystal 3 for displaying the current number of frames, the state of a battery, and the like, and a PN switch 4 used to select the size of a photographic picture located on the other side thereof. When the release button 2 is pressed, a sequence of photographic operations is executed. Moreover, when the PN switch 4 used to select a photographic picture size is set to the N position in the drawing, film is exposed in a normal picture size of 24 mm by 36 mm. When the PN switch 4 is set to the P position, film is exposed in a so-called panoramic size at which the upper and lower parts of a picture of the normal picture size are blocked.

Located on the face of the camera body 1 is a photography lens 7 fulfilling the function of normal photography. A viewfinder optical system 5 is located above the photography lens 7. A strobe 6 for emitting light at the time of a low luminance and thus serving as an auxiliary light source for photography is located by the side of the viewfinder window 5.

Figure 3:
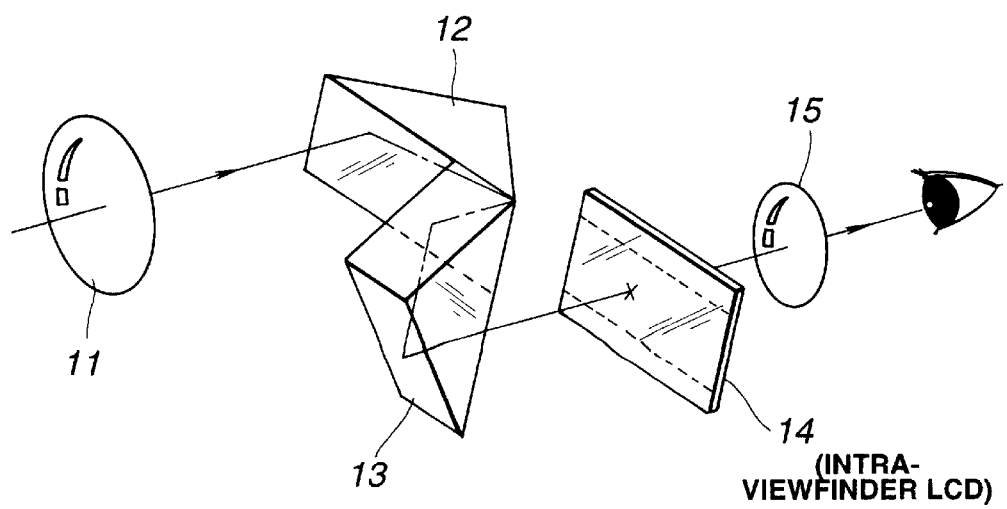
FIG. 3 is an exploded oblique view showing the structure of a major portion of a viewfinder optical system in the camera of the first embodiment.

FIG. 3 is an exploded oblique view showing the configuration of a major portion of the viewfinder optical system 5. As illustrated, the viewfinder optical system 5 includes: an objective lens 11; two erect prisms 12 and 13 located behind the objective lens; an intra-viewfinder transmission LCD 14 located near the focal plane of the objective lens 11 and used to display a picture size; and an eyepiece 15.

An object image taken through the objective lens 11 is passed by the two erect prisms 12 and 13. Thereafter, a picture size is defined by the LCD 14, and the image is formed on user's pupils through the eyepiece 15.

Figure 4:
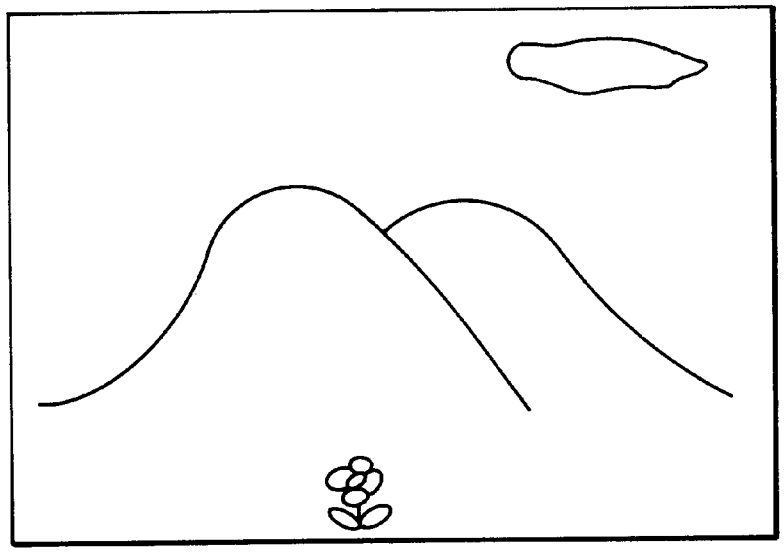
FIG. 4 is a front view showing an example of a field of view provided by the viewfinder optical system in the camera of the first embodiment when a standard size is set as a picture size.
Figure 5:
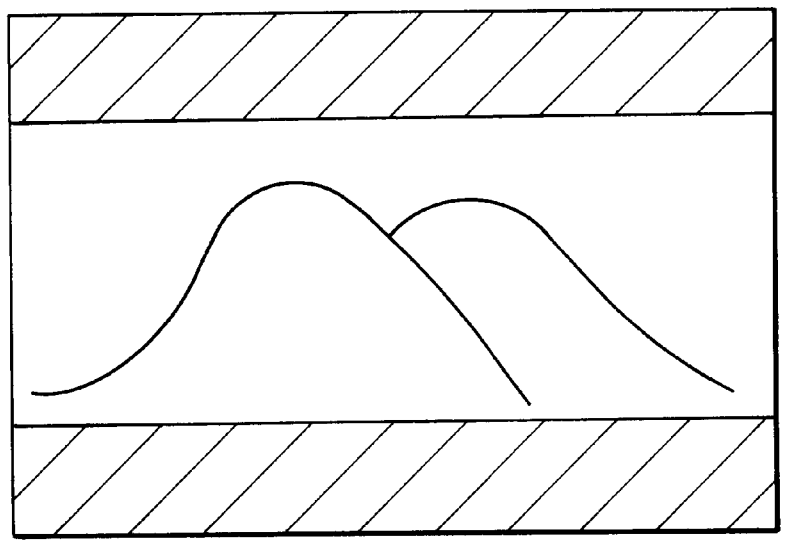
FIG. 5 is a front view showing an example of the field of view provided by the viewfinder optical system in the camera of the first embodiment when a panoramic size is set as the picture size.

FIGS. 4 and 5 are front view showing examples of the field of view provided by the viewfinder optical system 5. FIG. 4 shows an example of the field of view provided by the viewfinder optical system when a standard size is set as the picture size, and FIG. 5 is an example of the field of view provided by the viewfinder optical system when a panoramic size is set as the picture size.

Specifically, when the PN switch 4 is set to the N position, the standard size is set as the picture size. The field of view shown in FIG. 4 is provided. By contrast, when the PN switch is set to the P position, the panoramic size is set as the picture size and the field of view shown in FIG. 5 is provided. At this time, the upper and lower parts of the LCD 14 are intercepted from light according to the picture size for photography.

Figure 6:
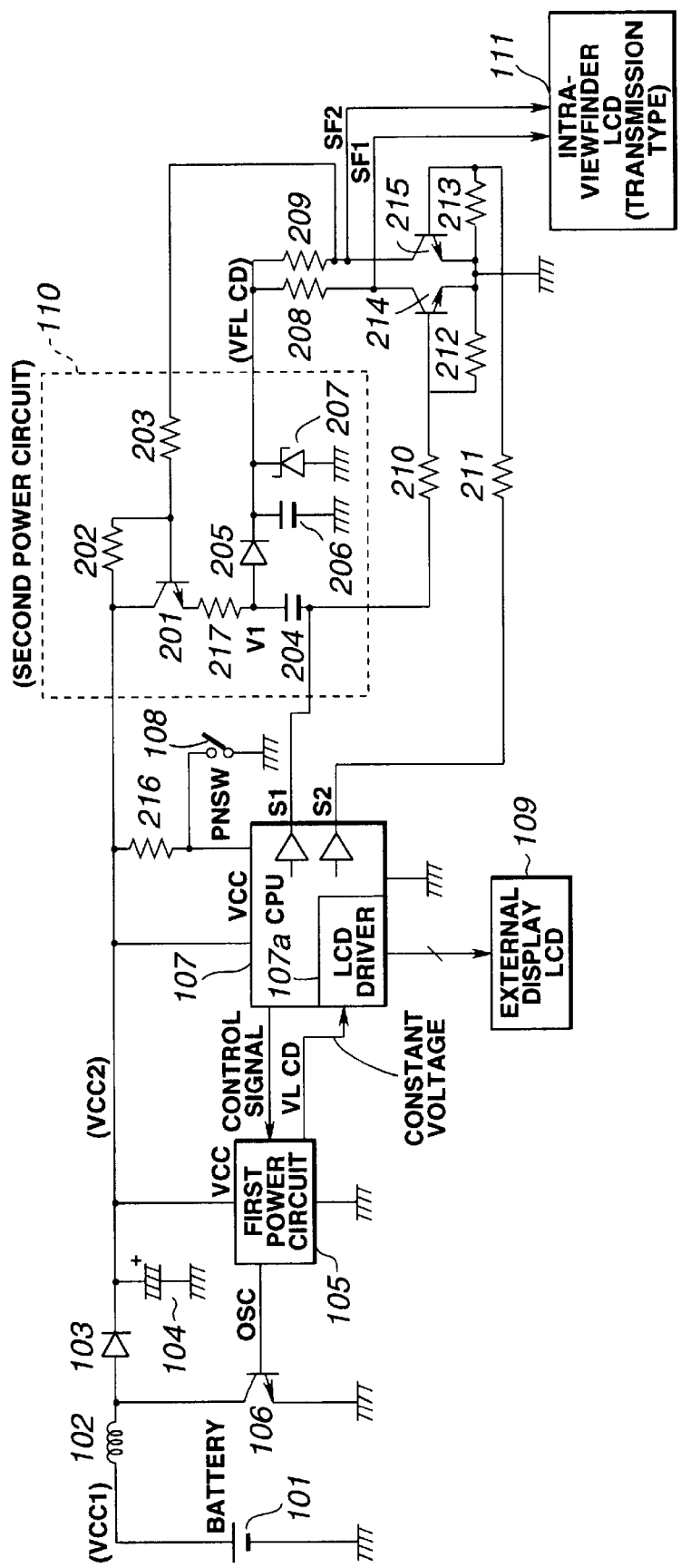
FIG. 6 is an electric circuit diagram showing the electrical circuitry-like configuration of the camera of the first embodiment.

FIG. 6 is an electrical circuit diagram showing the electrical circuitry-like configuration of the camera of the first embodiment.

The camera of this embodiment includes a battery 101 serving as a power supply source for the circuits in the camera. The supply voltage supplied from the battery 101 is a voltage VCC1. The positive terminal of the battery 101 is connected to the anode of a rectifier diode 103 via a booster coil 102. A smoothing capacitor 104 is connected between the cathode of the rectifier diode 103 and the ground.

Furthermore, a switching transistor 106 is connected between the anode of the rectifier diode 103 and the ground. The base terminal of the switching transistor 106 is connected to an OSC terminal of a first power circuit 105.

The first power circuit 105 is a power circuit for boosting the supply voltage VCC1 supplied from the battery 101 to a given voltage by controlling the switching transistor 106. Specifically, a cyclic signal is transmitted through the OSC terminal in order to turn on or off the switching transistor 106 cyclically. The switching transistor 106 is thus switched, causing a given supply voltage VCC2 produced by boosting the supply voltage VCC1 supplied from the battery 101 to develop at the cathode of the rectifier diode 103. The supply voltage VCC2 is a supply voltage for a control circuit system.

The first power circuit 105 monitors the supply voltage VCC2 at the terminal VCC thereof, and controls boosting in such a way that the voltage VCC2 falls within a given range of voltages (for example, 3.4 V to 3.6 V). In other words, the frequency of the cyclic signal sent through the OSC terminal is adjusted.

Moreover, the first power circuit 105 includes a constant voltage circuit capable of generating a constant voltage irrespective of a variation in supply voltage. The constant voltage circuit outputs a constant voltage VLCD. The constant voltage VLCD is applied to an LCD driver 107a incorporated in a CPU 107 that will be described later. A control signal sent from the CPU 107 is input to the first power circuit 105. According to the control signal, the first power circuit 105 does not carry out boosting when the camera is on standby but carries out boosting when a motor must be driven or a strobe capacitor must be charged.

The CPU 107 is a CPU (arithmetic control circuit) for controlling a sequence of operations performed by the circuits in the camera, and has an LCD driver 107a for driving an external display LCD 109 (corresponding to the external display liquid crystal 3 in FIG. 1) therein. The constant voltage VLCD supplied from the first power circuit 105 is, as mentioned above, applied to the LCD driver 107a.

A PN switch 108 (corresponding to the PN switch 4 in FIG. 1) is connected together with a pull-up resistor 216. The PN switch 108 has the output voltage thereof pulled up to the voltage VCC2 by means of the pull-up resistor 216.

The CPU 107 further includes output ports S1 and S2 for outputting driving signals for the intra-viewfinder LCD 111 and second power circuit 110 which will be described later.

The second power circuit 110 is connected to the cathode of the rectifier diode 103, and comprises the following circuit elements: a switching transistor 201 to which the voltage VCC2 is applied; a shunt resistor 202 for the transistor 201; a base resistor for the transistor 201; a current-limiting resistor 217 connected to the collector of the transistor 201; a capacitor 204 connected between the current-limiting resistor 217 and the output port S1 of the CPU 107; a rectifier diode 205 having the anode thereof connected to the output port S1 via the capacitor 204; a zener diode 207, connected to the cathode of the rectifier diode 205, for limiting a voltage; and a capacitor 206 connected to the cathode of the rectifier diode 205.

In this embodiment, the zener diode 207 is a zener diode exhibiting a zener voltage of 5.6 V.

A supply voltage VFLCD boosted by the second power circuit 110 develops at the output terminal of the second power circuit 110, that is, the cathode of the rectifier diode 205.

Transistors 214 and 215 are connected to the cathode of the rectifier diode 205 via a current-limiting resistor 208 and current-limiting resistor 209 respectively. A base resistor 210 is connected between the base of the transistor 214 and the output port S1 of the CPU 107, and a shunt resistor 212 is connected between the base and emitter of the transistor 214. A base resistor 211 is connected between the base of the transistor 215 and the output port S2 of the CPU 107, and a shunt resistor 213 is connected between the base and emitter of the transistor 215.

The collector output terminals of the transistors 214 and 215 are connected to the intra-viewfinder LCD 111. The collector output terminal of the transistor 215 is connected to the base of the transistor 201 via the base resistor 203.

The second power circuit 110 switches the transistors 214 and 215 alternately and thus causes them to generate signals SF1 and SF2 respectively. The intra-viewfinder transmission LCD 111 is driven with these signals SF1 and SF2.

Next, boosting performed by the second power circuit 110 will be described.

FIGS. 7A to 7D are charts showing waveforms of voltages generated by the circuit elements of the second power circuit 110.

FIGS. 7A to 7D show waveforms of voltages generated by the circuit elements of the second power circuit 11 under the conditions that the voltage VCC2 is 3 V, the first power circuit 105 is, for example, not boosting its output voltage, and the battery voltage is 3 V.

Figure 7A:
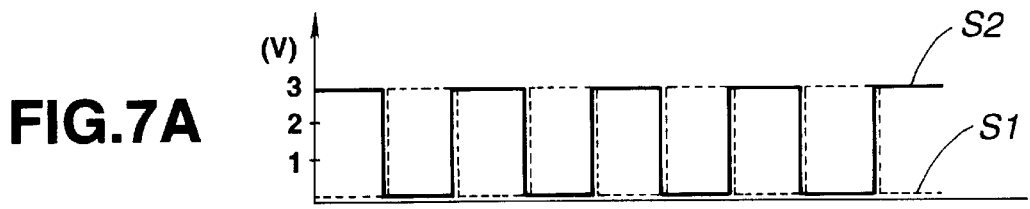
FIGS. 7A to 7D are charts showing waveforms of voltages developed at elements in a second power circuit in the camera of the first embodiment.

FIG. 7A shows the waveforms of voltages applied to the output ports S1 and S2 of the CPU 107. In the drawing, the waveform of the voltage to be applied to the port S1 is indicated with a dashed line, and the waveform of the voltage to be applied to the port S2 is indicated with a solid line.

As mentioned above, the signals output through the output ports S1 and S2 are rectangular waves that are mutually 180° out of phase. The voltage level of the signals is nearly equal to that of the voltage VCC2.

Figure 7B:
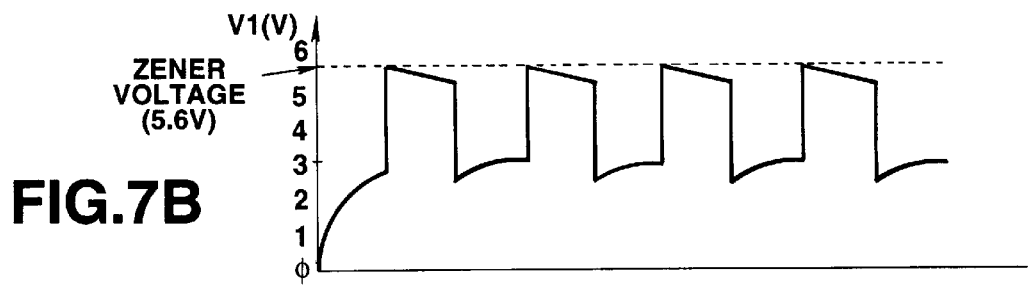

FIG. 7B shows the waveform of a voltage V1 developed at one terminal of the capacitor 204. When the output port S1 of the CPU 107 is driven low, the one terminal of the capacitor 204 goes to the ground level. When the port S2 is driven high at the same time, the transistor 215 is turned on and the transistor 201 is turned on. This causes the capacitor 204 to be charged via the resistor 217.

By contrast, when the output port S1 is driven high, the one terminal of the capacitor 204 is raised to the VCC2 level. When the port S2 is driven low at the same time, the transistor 215 is turned off and the transistor 201 is turned off. This causes the potential V1 to go up to the zener voltage (5.6 V) of the zener diode 207.

Thereafter, the charge in the capacitor 204 is accumulated in the capacitor 206 via the diode 205. Part of the charge is released to the base of the transistor 201 via the resistor 217. This causes the potential V1 to decrease gradually for a given time constant.

Figure 7C:
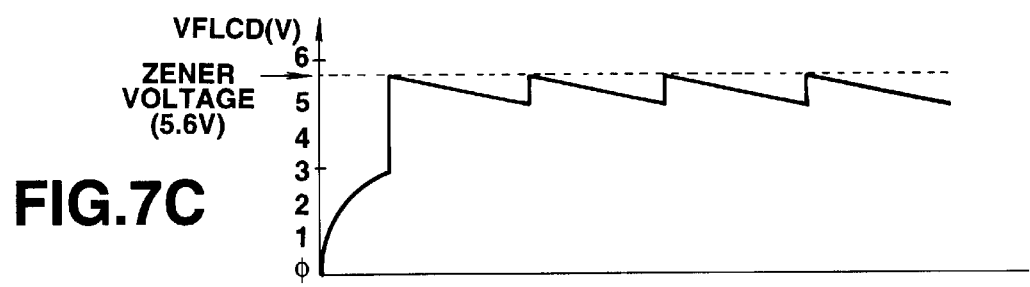

The foregoing operation is repeated, whereby the level of the output voltage VFLCD of the second power circuit 110 varies as shown in FIG. 7C.

Figure 7D:
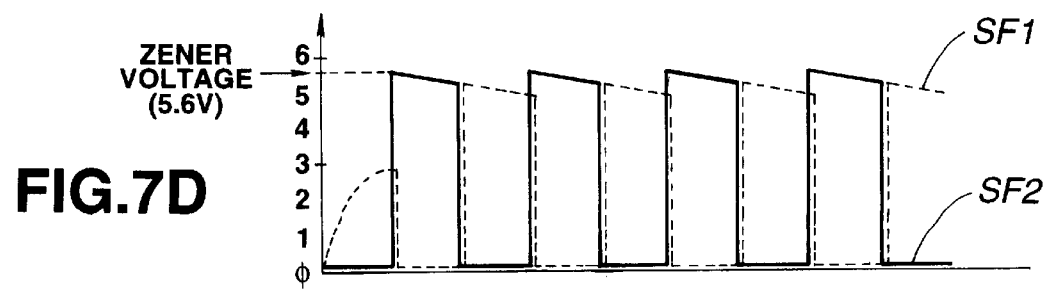

When the voltage VFLCD has the level thereof varied as shown in FIG. 7C, the waveform of a driving voltage used to drive the intra-viewfinder LCD 111 is as shown in FIG. 7D.

FIGS. 8A to 8D are charts showing the relationships between the frequency of the output signals output through the output ports S1 and S2 of the CPU 107 for driving the second power circuit 110 and the voltages V1 and VFLCD.

Figure 8A:
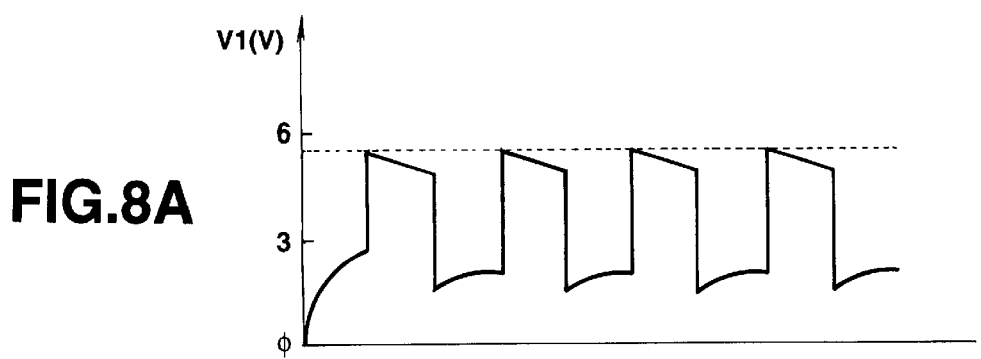
FIGS. 8A to 8D are charts showing the relationships between the frequencies of output signals sent through output ports S1 and S2 of a CPU for driving the second power circuit in the camera of the first embodiment, and voltages V1 and VFLCD.
Figure 8B:
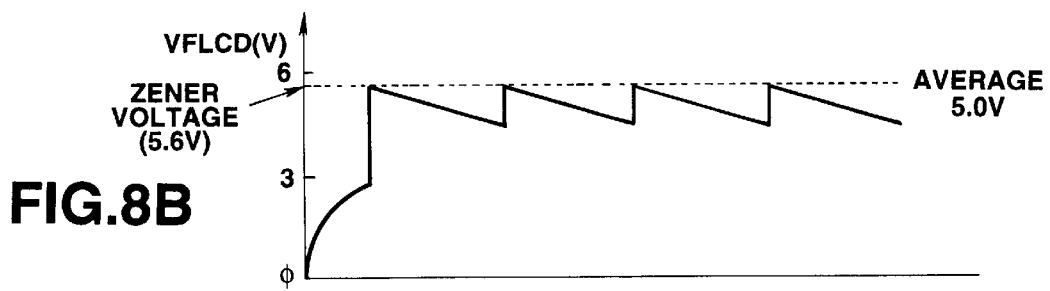
Figure 8C:
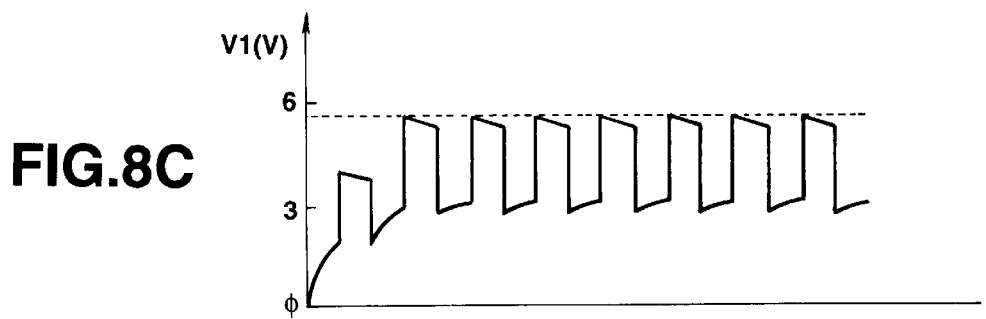
Figure 8D:
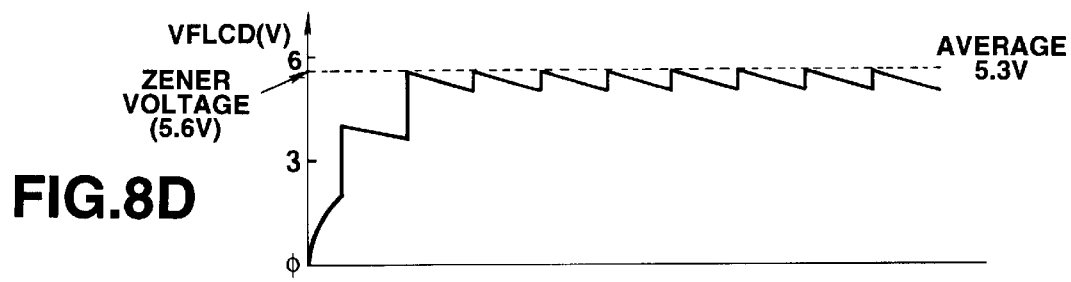

Specifically, FIG. 8A shows the waveform of the voltage V1 observed when the frequency of the output signals output through the output ports S1 and S2 is relatively low, FIG. 8B shows the waveform of the voltage VFLCD observed when the frequency of the output signals is relatively low, FIG. 8C shows the waveform of the voltage V1 observed when the frequency of the output signals output through the output ports S1 and S2 is relatively high, and FIG. 8D shows the waveform of the voltage VFLCD observed when the frequency of the output signals is relatively high.

As shown in FIGS. 8A to 8D, when the port S1 is high, the voltage VFLCD decreases gradually. When the frequency is higher within a range not hindering charging of the capacitor 204, the average level of the voltage VFLCD gets higher.

Figure 9:
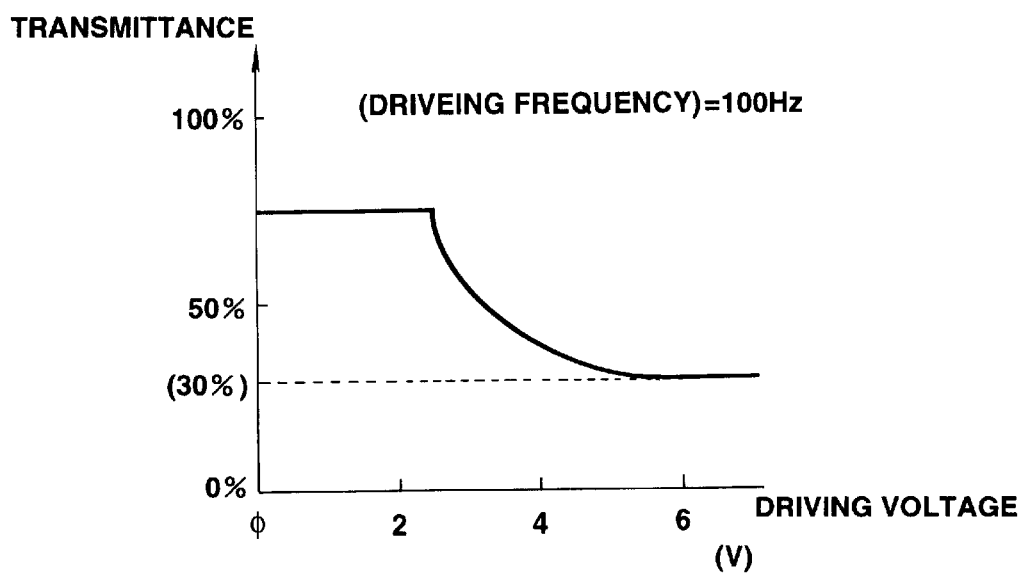
FIG. 9 is an explanatory diagram showing a change in density of a mask portion of an intra-viewfinder LCD in the camera of the first embodiment occurring when a driving voltage is varied with a driving frequency fixed.
Figure 10:
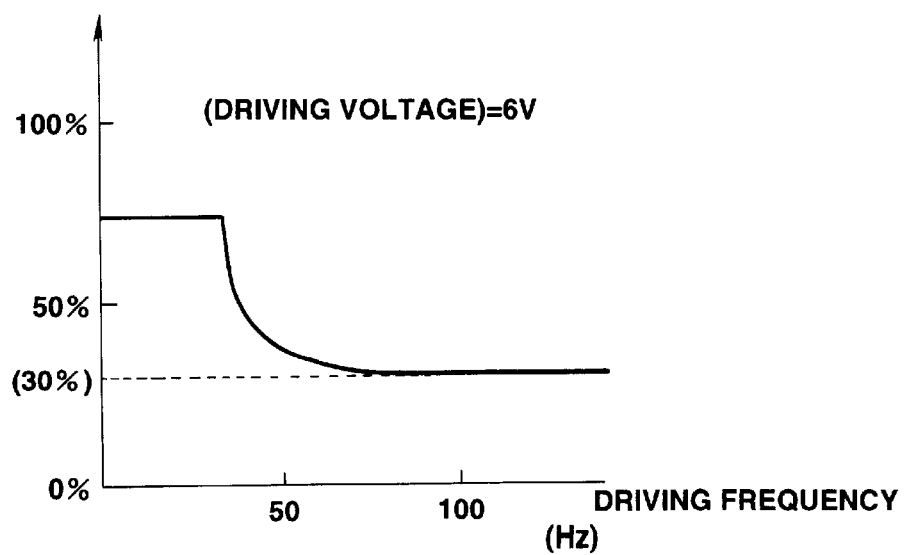
FIG. 10 is an explanatory diagram showing a change in density of the mask portion of the intra-viewfinder LCD in the camera of the first embodiment occurring when the driving frequency is varied with the driving voltage fixed.

FIGS. 9 and 10 are graphs showing a change in density of a mask portion occurring when the intra-viewfinder LCD 111 is driven. The intra-viewfinder LCD 111 is formed with, for example, a guest-host type transmission liquid crystal.

FIG. 9 shows a change in density occurring when the driving frequency is fixed to, for example, 100 Hz and the driving voltage is varied. As apparent from the graph, the change in density occurs within a range from about 2.5 V to 6 V.

FIG. 10 shows a change in density occurring when the driving voltage is fixed to 6 V and the driving frequency is varied. As apparent from the graph, the change is density occurs within a range from about 35 Hz to 100 Hz.

As mentioned above, as the driving frequency is higher or the driving voltage is higher, the density can be increased. Moreover, as shown in FIGS. 8B and 8D, as the driving frequency is higher, the voltage VFLCD gets higher. In this embodiment, the change in density of the liquid crystal is controlled by utilizing the synergistic effect of the driving frequency and driving voltage.

Moreover, when the voltage VCC2 is 3 V or higher, if the frequency is made constant, the voltage VFLCD becomes constant. It will not take place that the density of the light-intercepted parts of the intra-viewfinder LCD 111 set to a panoramic mode varies depending on the operating state of the camera, that is, whether or not the first power circuit 105 is boosting its output voltage.

By the way, immediately after the battery is exhausted or a large current is consumed, the supply voltage VCC1 supplied from the battery drops. Consequently, when the first power circuit 105 is not boosting its output voltage, the density of the light-intercepted parts of the intra-viewfinder LCD 111 decreases. There is a fear that the change in density of the light-intercepted parts of the intra-viewfinder LCD 111 occurring between the start and end of boosting performed by the first power circuit 105 may gives a user a sense of unnaturalness.

The camera of this embodiment takes account of the circumstances. When the first power circuit 105 is not boosting its output voltage, the driving frequency at which the intra-viewfinder LCD 111 is driven is made higher than when the first power circuit 105 is boosting its output voltage.

Figure 11:
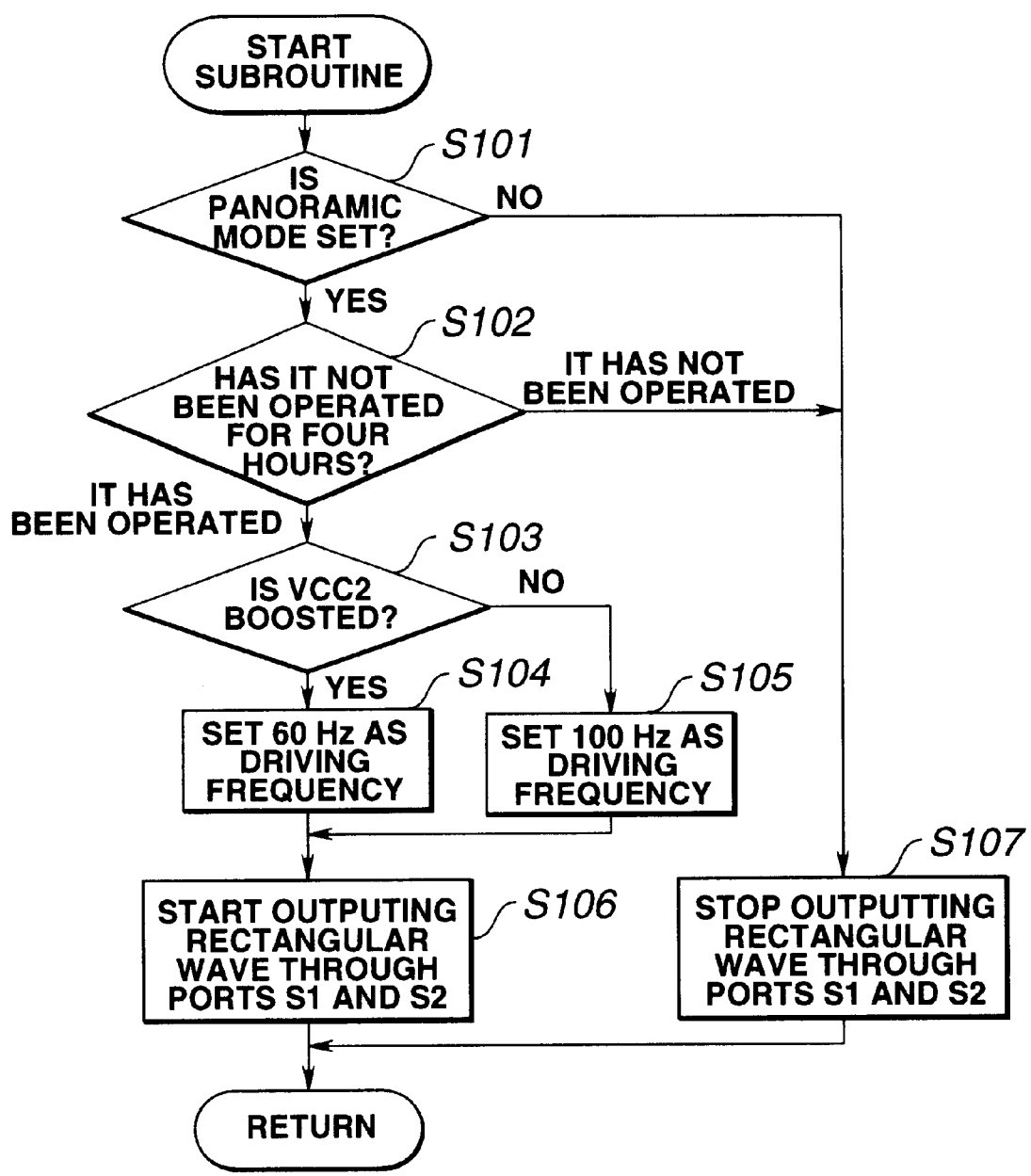
FIG. 11 is a flowchart describing a subroutine for setting the driven state of the intra-viewfinder LCD in the camera of the first embodiment.

FIG. 11 is a flowchart describing a subroutine for setting the driven state of the intra-viewfinder LCD 111. Every time the state of the camera is changed, the subroutine is called.

First, when the subroutine is called, the CPU 107 detects the state of the PN switch 4 (step S101). If the panoramic mode is set, control is passed to step S102. If the panoramic mode is not set, control is passed to step S107.

At step S102, it is judged from the time indicated by a built-in timer whether or not an operation member such as the release button 2 or PN switch 4 has not been operated for past four hours. If the operation member has not been operated for past four hours, control is passed to step S107. If it has not been four hours since the operation member was operated, control is passed to step S103.

At step S103, it is judged whether or not the voltage VCC2 is boosted (or about to be boosted). If the voltage VCC2 is boosted (about to be boosted), control is passed to step S104. Otherwise, control is passed to step S105.

At step S104, a rectangular wave output circuit for outputting a rectangular wave to the ports S1 and S2, which is incorporated in the CPU 107, is set to a frequency of 60 kHz. At step S105, the rectangular wave output circuit for the ports S1 and S2 is set to a frequency of 100 kHz.

At step S106, outputting the rectangular wave through the ports S1 and S2 is started. At step S107, the ports S1 and S2 are fixed to a low level, and the output is stopped. The subroutine is terminated and control is returned.

The camera of this embodiment is designed in such a way that the external display LCD 109 is turned off unless it is operated for four minutes and a half. However, the intra-viewfinder LCD 111 continues displaying data for up to four hours. This is intended to prevent a photographer from pressing a shutter button while he/she takes the panoramic mode for the normal mode or vice versa after he/she leaves the camera intact for some time.

Moreover, even when display of either the external display LCD 109 or intra-viewfinder LCD 111 is turned off, if the PN switch 4 is operated, the display of the intra-viewfinder LCD 11 is restarted.

As mentioned above, according to the camera of this embodiment, the advantages described below are exerted.

(1) Since a boosting circuit for driving the intra-viewfinder LCD and generating a voltage higher than the voltage produced by a boosting circuit for driving a control circuit system including a CPU is included aside from the boosting circuit for driving the control circuit system, a current to be consumed when the intra-viewfinder LCD is driven can be suppressed. When the camera is on standby, even if the intra-viewfinder LCD is operated to display data for a prolonged period of time, exhaustion of the buttery can be minimized.

(2) The port of the CPU used to drive the intra-viewfinder LCD is also used to drive the boosting circuit for driving the intra-viewfinder LCD. The number of necessary ports of the CPU can therefore be minimized. Consequently, a compact design and low cost can be realized.

(3) Since the zener diode is used to restrict the high-voltage level of the voltage VFLCD, a change in density of the intra-viewfinder LCD deriving from the conditions for power supply can be suppressed.

(4) The driving frequency at which the intra-viewfinder LCD and the boosting circuit for driving the intra-viewfinder LCD are driven is changed according to the controlled state of the camera. The change in density of the intra-viewfinder LCD deriving from the conditions for power supply can therefore be suppressed.

In this embodiment, changing the driving frequency is dependent on the controlled state of the camera. Alternatively, the driving frequency may be changed by monitoring the level of the voltage VCC2 or voltage VLCD. Moreover, the frequency values to which the driving frequency is changed may not be 100 Hz and 60 Hz. Moreover, the number of the frequency values may not be two or may be two or larger.

Next, another example of the subroutine for setting the driven state of the intra-viewfinder LCD in the first embodiment will be described.

Figure 12:
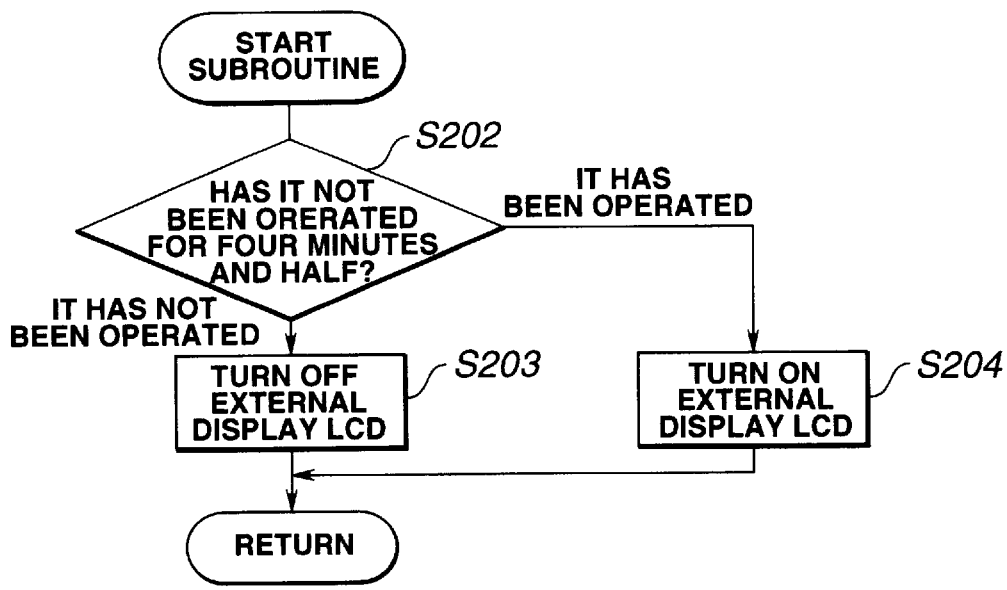
FIG. 12 is a flowchart describing another example of the subroutine for setting the driven state of the intra-viewfinder LCD in the camera of the first embodiment.
Figure 13:
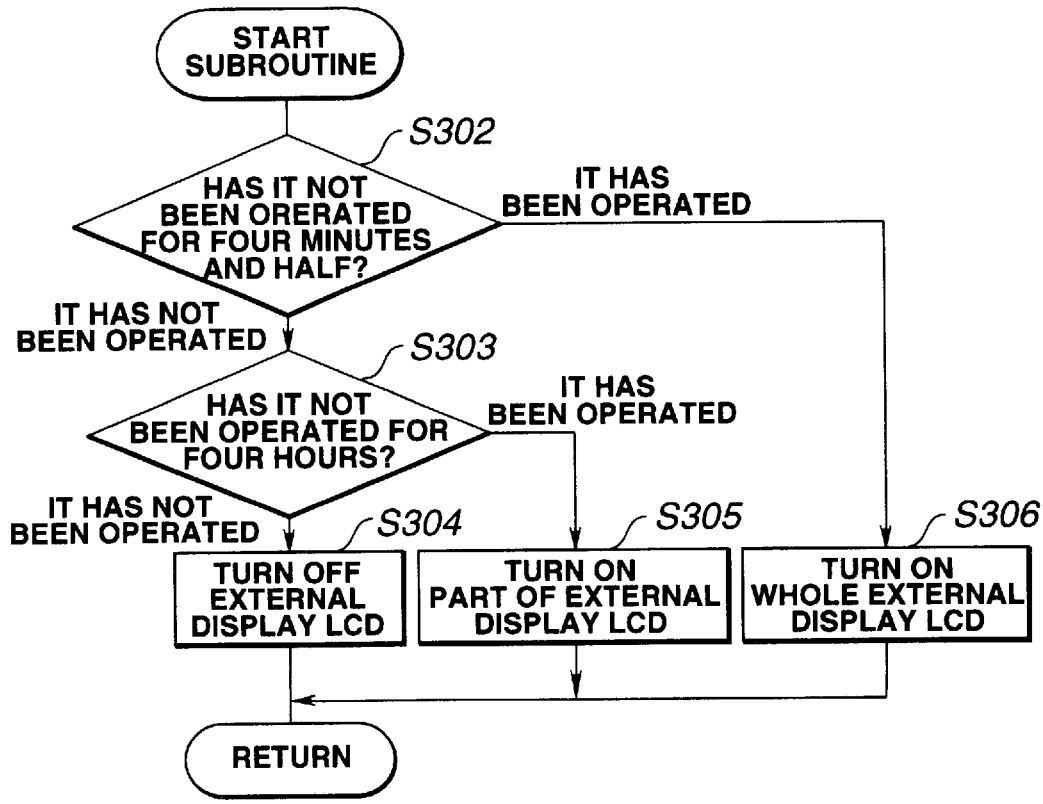
FIG. 13 is a flowchart describing yet another example of the subroutine for setting the driven state of the intra-viewfinder LCD in the camera of the first embodiment.

FIG. 12 is a flowchart describing another example of the subroutine for setting the driven state of the intra-viewfinder LCD in the camera of the first embodiment, and FIG. 13 is a flowchart describing yet another example of the subroutine for setting the driven state of the intra-viewfinder LCD in the camera of the first embodiment.

FIG. 12 is a flowchart describing a subroutine for setting the driven state of the external display LCD 109. The subroutine is called frequently while the camera is on.

First, when the subroutine is called, control is passed to step S202. It is judged from the time indicated by the built-in timer whether or not the operation member such as the release button 2 has not been operated for past four minutes and a half. If the operation member has not been operated for the past four minutes and a half, control is passed to step S203. The display of the external display LCD is turned off. The subroutine is then terminated, and control is returned.

If it is found at step S202 that the operation member has been operated for the past four minutes and a half, that is, it has not been four minutes and a half since the operation member was operated, control is passed to step S204. The display of the external display LCD remains on. The subroutine is then terminated, and control is returned.

FIG. 13 is a flowchart describing an example, which is different from the example described in FIG. 12, of the subroutine for setting the driven state of the external display LCD 109. The subroutine is called frequently while the camera is on.

First, when the subroutine is called, control is passed to step S302. It is judged from the time indicated by the built-in timer whether or not the operation member such as the release button 2 has not been operated for past four minutes and a half. If the operation member has not been operated for the past four minutes and a half, control is passed to step S303.

If it is found at step S302 that the operation member has been operated for the past four minutes and a half, that is, it has not been four minutes and a half since the operation member was operated, control is passed to step S306. The whole display of the external display LCD is left on. The subroutine is terminated, and control is returned.

By the way, at step S303, it is judged from the time indicated by the built-in timer whether or not the operation member has not been operated for past four hours. If the operation member has not been operated for the past four hours, control is passed to step S304. The display of the external display LCD is then turned off. The subroutine is terminated, and control is returned.

If it is found at step S303 that the operation member has been operated for the past four hours, that is, it has not been four hours since the operation member was operated, control is passed to step S305. The display of part of the external display LCD is left on. The subroutine is then terminated, and control is returned.

As mentioned above, even when the operation member has not been operated for past four minutes and a half, if the whole display provided by the external display LCD 109 is not turned off but part of the display, for example, important information such as the number of frames is left intact and the other part thereof is turned off, both ease of use and a minimized current consumption can be accomplished.

Next, the second embodiment of the present invention will be described.

Figure 14:
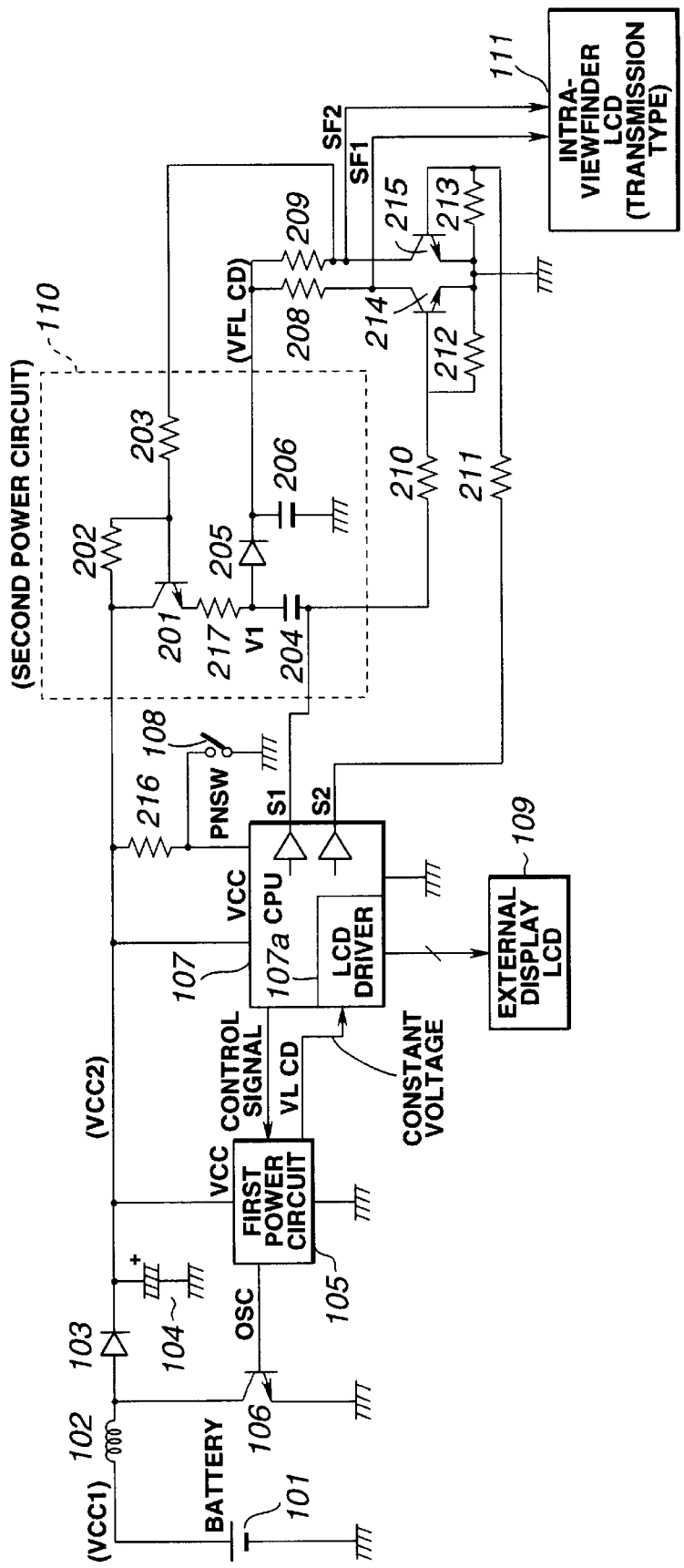
FIG. 14 is an electrical circuit diagram showing the electrical circuitry of a camera of the second embodiment of the present invention.

FIG. 14 is an electrical circuit diagram showing the electrical circuitry of a camera of the second embodiment of the present invention. The same reference numerals will be assigned to the components identical to those of the first embodiment. The description of the components will be omitted.

The second embodiment has nearly the same circuitry as the first embodiment, and is characterized in that the zener diode 207 included in the first embodiment is excluded. The other components of the second embodiment and the operation thereof are identical to those of the first embodiment. The description of the components and operation will be omitted.

As mentioned previously in the description of the first embodiment, when the driving frequency to be set for supplying an output signal through the output ports S1 and S2 of the CPU 107 is changed according to the state of the camera, the density of the intra-viewfdinder LCD 111 can be varied. In the second embodiment, the driving frequency to be set for supplying an output signal through the ports S1 and S2 is changed depending on whether or not the first power circuit 105 is boosting its output voltage but the upper limit of the voltage VFLCD is not suppressed using a zener diode. Thus, a change in appearance of the intra-viewfinder LCD 111 is suppressed.

According to the second embodiment, compared with the first embodiment, low cost and space saving can be realized.

Next, the third embodiment will be described.

Figure 15:
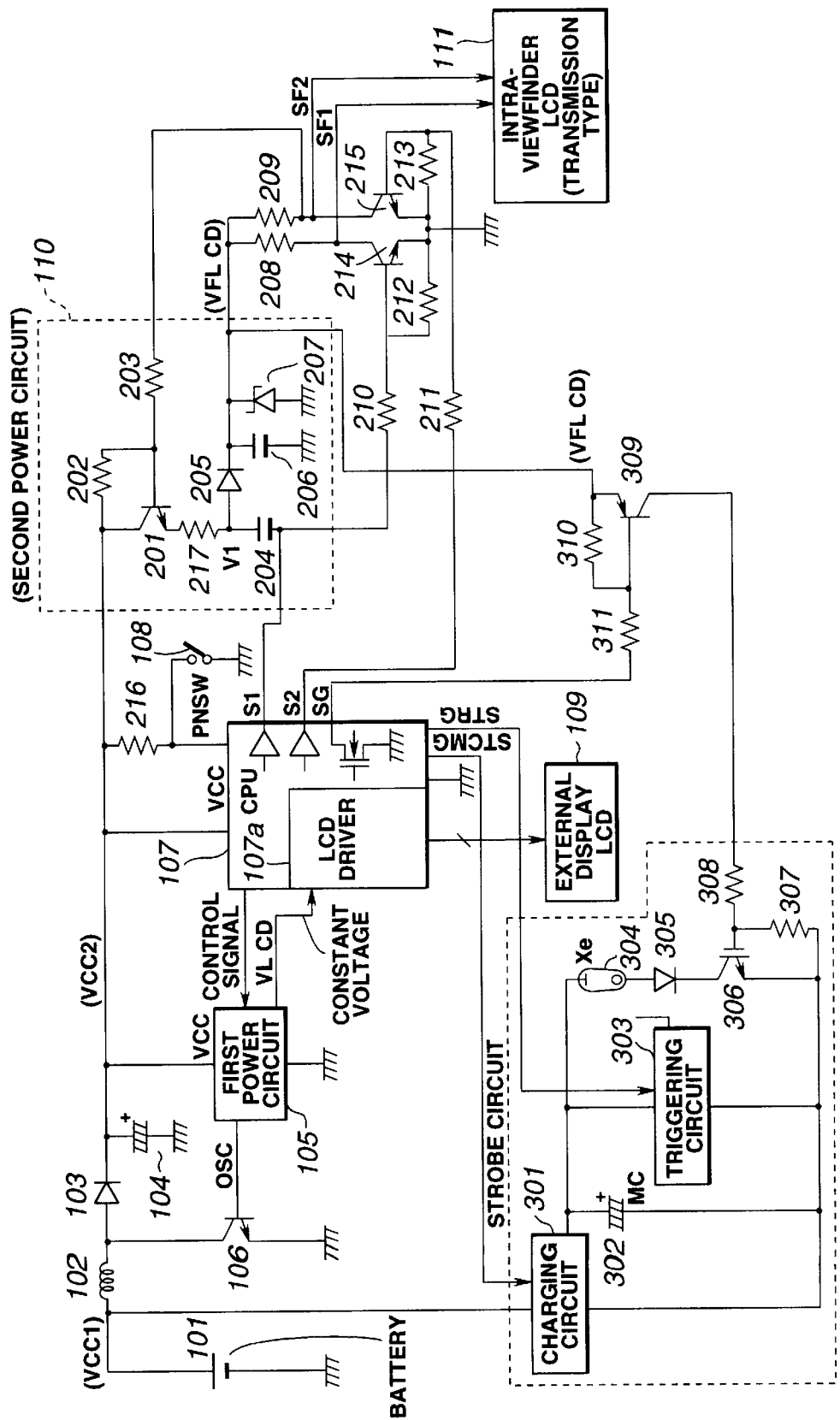
FIG. 15 is an electrical circuit diagram showing the electrical circuitry-like configuration of a camera of the third embodiment of the present invention.

FIG. 15 is a n electrical circuit diagram showing the electrical circuitry-like configuration of a camera of the third embodiment of the present invention. The same reference numerals will be assigned to the components identical to those of the first embodiment. The description of the components will be omitted.

The third embodiment comprises, in addition to the same components as those of the first embodiment (See FIG. 6), a strobe circuit 300, interface circuits (309 to 311), and an open-drain output port SG of the CPU 107. The other components of the third embodiment and the operation thereof are identical to those of the first embodiment. The description of the components and operation will be omitted.

The strobe circuit 300 will be described.

The strobe circuit 300 comprises a charging circuit 301 that operates under the control of the CPU 107 so as to boost a supply voltage VCC1 supplied from the battery 101, and to charge a main capacitor 302, the main capacitor 302 for flashing a strobe which is connected in parallel with the charging circuit 301 and charged by the charging circuit, a triggering circuit 303, a xenon tube 304 that is a flashtube, an anti-reverse current diode 305 connected in series with the xenon tube 304, an insulated gate bipolar transistor (IGBT) 306, a shunt resistor for the IGBT 306, and a gate protection resistor 308.

The triggering circuit 303 generates a high voltage under the control of the CPU 107, and applies a triggering voltage used for flashing to the xenon tube 304. The IGBT 306 can be used to stop flashing of the xenon tube 304 by controlling the gate voltage of the IGBT.

Moreover, the gate of the IGBT 306 is connected to the collector of a gate driving transistor 309 via the gate protection resistor 308. The emitter of the transistor 309 is connected to an output terminal of the second power circuit 110, that is, the cathode of the diode 205. A voltage VFLCD is applied to the emitter of the transistor 309.

Moreover, the base of the gate protection transistor 309 is connected to an output port SG of the CPU 107 via a base resistor 311. A shunt resistor 310 is connected between the emitter and base of the transistor 309.

Now, an operation of the camera of the third embodiment for suspending flashing during strobe flashing will be described.

Figure 16:
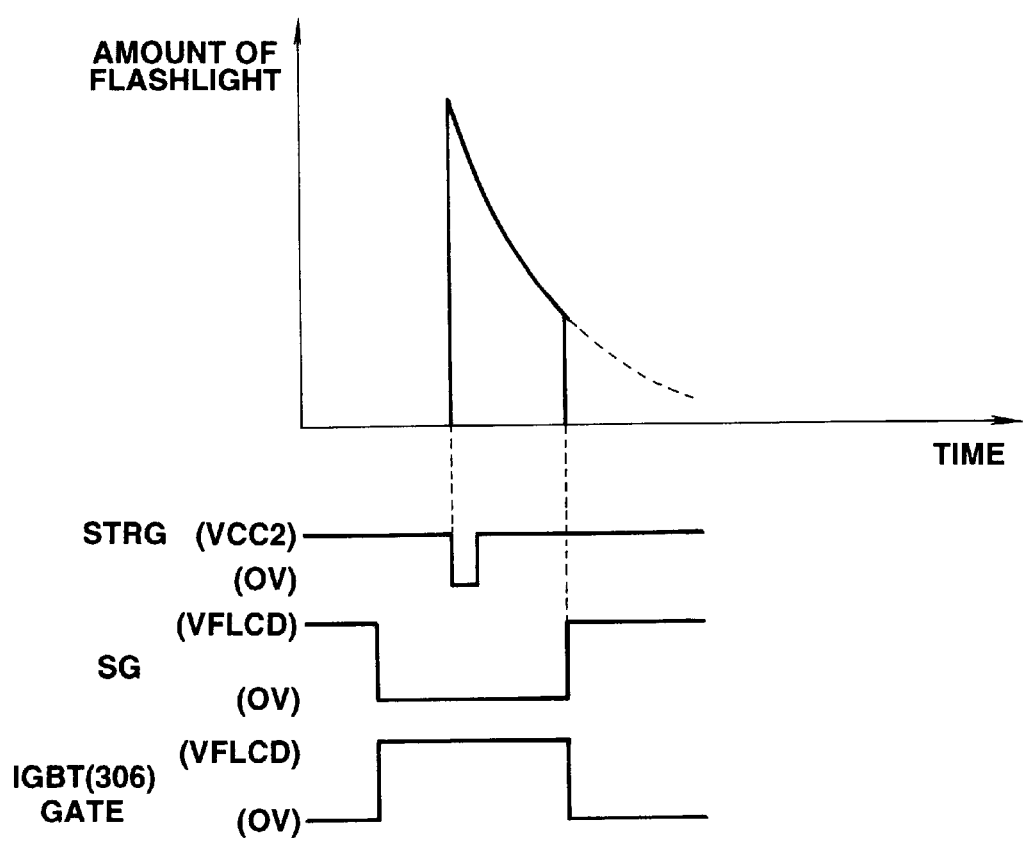
FIG. 16 is an explanatory diagram showing an amount of strobe light, a triggering control signal sent from a CPU, a gate control signal to be applied to an IGBT, and the gate potential of the IGBT in the camera of the third embodiment.

FIG. 16 is an explanatory diagram showing an amount of strobe light, a triggering control signal (STRG) sent from the CPU, a gate control signal (SG) to be applied to the IGBT, and the gate potential of the IGBT in the camera of the third embodiment.

When the camera is on standby, the IGBT 306 is turned off. The gate control signal SG to be applied to the IGBT is high (open). Before the strobe is flashed, the signal SG is driven low in order to turn on the IGBT 306. At this time, the voltage VFLCD is applied to the gate of the IGBT 306. The level of the voltage VFLCD is higher than that of the voltage VCC 2. A current value which the IGBT 306 can withstand can be determined with a margin.

Next, the triggering control signal (STRG) sent from the CPU 107 is made a high-to-low transition for triggering. This causes the xenon tube 304 to be excited, whereby flashing starts. After the flashing is completed, when a given time has elapsed, the gate control signal SG to be applied to the IGBT is made a low-to-high transition in order to set the amount of flashlight to a given value. This causes the gate of the IGBT 306 to make a high-to-low transition. Flashing is stopped.

As mentioned above, according to the third embodiment, a sufficient gate voltage is applied for turning on the IGBT. A low-cost IGBT can be employed. Besides, durability can be improved.

Moreover, since a boosting circuit different from the boosting circuit for boosting an output voltage of the power supply for the control circuit system is employed, compared with when the output voltage of the power supply for the control circuit system is boosted to a high voltage, a current consumption of the whole camera can be suppressed.

Moreover, the power supply whose voltage is boosted by the boosting circuit used to drive the intra-viewfinder LCD is also used to drive the IGBT, the necessity of including another boosting circuit is obviated. Low cost and space saving can be achieved.

Next, the fourth embodiment of the present invention will be described.

Figure 17:
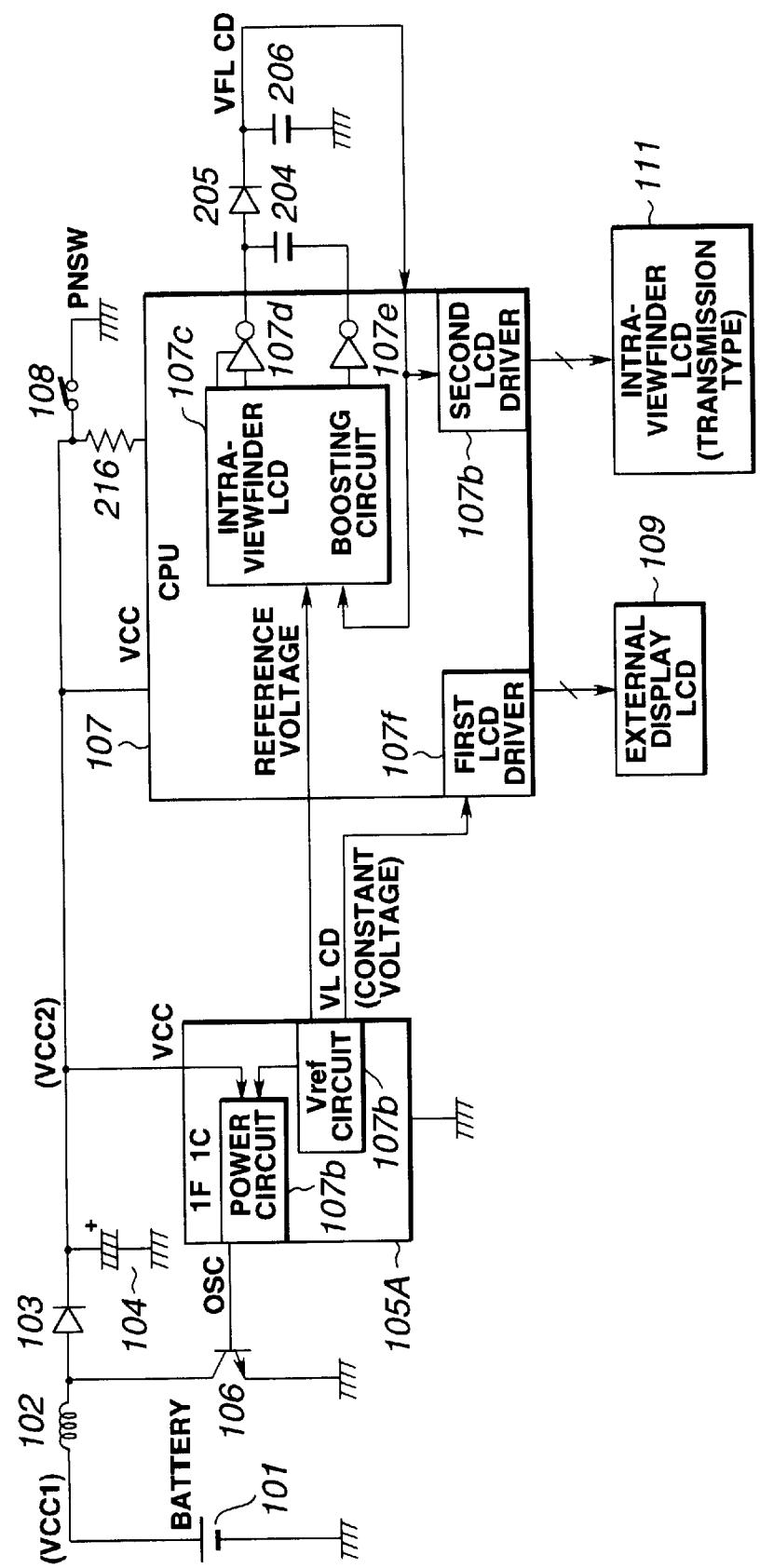
FIG. 17 is an electrical circuit diagram showing the electrical circuitry-like configuration of a camera of the fourth embodiment of the present invention.

FIG. 17 is an electrical circuit diagram showing the electrical-circuitry like configuration of a camera of the fourth embodiment of the present invention. The same reference numerals will be assigned to the components identical to those of the first embodiment. The description of the components will be omitted.

The basic configuration of the fourth embodiment is nearly identical to that of the first embodiment. However, the first power circuit 105 and CPU 107 have different configurations. The other components of the fourth embodiment and the operation thereof are identical to those of the first embodiment. The description of the components and operation will be omitted.

As shown in FIG. 17, in the fourth embodiment, the first power circuit 105 is replaced with an interface IC (IFIC) 105A including a power circuit. Specifically, a first power circuit is incorporated as part of the interface IC that is, as conventionally, designed to execute an automatic focus function or motor driving function.

Moreover, the IFIC 105A is realized with a chip different from that having the CPU 107. For example, the CPU 107 is realized with a CMOS device, while the IFIC 105 is realized with a bipolar device.

By the way, in this embodiment, the major portion of the second power circuit 110 is included in the CPU 107 and incorporated in a one-chip IC.

Now, the internal configuration of the IFIC 105A will be described.

The IFIC 105A includes a power circuit 105a and a Vref circuit 105b. The power circuit 105a is a circuit portion filling the same role as the control unit included in the first power circuit 105 for providing an OSC signal. Specifically, the power circuit 105a controls the transistor 106 while monitoring the voltage VCC2.

Moreover, the Vref circuit 105b is a circuit portion for generating a constant voltage irrespective of the level of the supply voltage VCC1 supplied from the battery 101. Various constant voltages generated by the Vref circuit 105b are supplied as power used to drive the external display LCD 109 to a first LCD driver 107f included in the CPU 107, and also supplied as a reference voltage used to control boosting to an intra-viewfinder LCD boosting circuit 107c included in the CPU 107. Moreover, the constant voltages are also supplied as a reference voltage used to control boosting to the power circuit 105a.

Next, the internal configuration of the CPU 107 in the fourth embodiment will be described.

Included in the CPU 107 of this embodiment are the intra-viewfinder LCD boosting circuit 107c, associated inverters 107d and 107e, and first and second LCD drivers 107f and 107b.

The first LCD driver 107f corresponds to the LCD driver 107a in the first embodiment, and uses a constant voltage VLCD generated by the Vref circuit 105b as driving power to drive the external display LCD 109.

Moreover, the second LCD driver 107b uses the voltage VFLCD as driving power to drive the intra-viewfinder LCD 111. Specifically, the second LCD driver 107b corresponds to the transistors 214 and 215 in the first embodiment.

Moreover, a circuit portion composed of the intra-viewfinder LCD boosting circuit 107c and inverters 107d and 107e corresponds to a circuit portion including the transistor 201 in the first embodiment. Now, boosting performed by the intra-viewfinder LCD boosting circuit 107c and surrounding circuits will be described.

FIG. 18 is an explanatory diagram showing the characteristic of the voltage VFLCD to be boosted in the fourth embodiment.

In the CPU 107, when the inverter 107d outputs a high-level signal and the inverter 107e outputs a low-level signal, the capacitor 204 is charged. When the inverter 107d offers a high impedance and the inverter 107e outputs a high-level signal, the charge in the capacitor 204 is accumulated in the capacitor 207 via the diode 205.

By repeating this sequence, the voltage VFLCD is boosted. The volt age VFLCD is fed back to the intra-viewfinder LCD boosting circuit 107c, compared with the reference voltage provided by the Vref circuit 105b. For example, when the voltage VFLCD exceeds 5 V, boosting is stopped. When the voltage VFLCD becomes 5 V or lower, boosting is restarted. Thus, the voltage VFLCD is retained nearly at 5 V.

As mentioned above, according to the fourth embodiment, the advantages described below can be exerted.

(1) Since the major portion of the intra-viewfinder LCD boosting circuit is incorporated in the CPU 107, the space occupied by electrical parts is limited. This contributes to realization of the compact design of the camera and the low price thereof.

(2) Since the voltage VFLCD is retained nearly constant owing to the feedback control, the driving frequency at which the intra-viewfinder LCD is driven need not be changed. Consequently, a driving program becomes simple. Moreover, since the voltage VFLCD remains constant irrespective of conditions, the appearance of the intra-viewfinder LCD hardly varies but enjoys high definition.

(3) Since a means for generating a reference voltage is formed on a chip different from the one having the CPU, the reference voltage can be generated highly precisely using, for example, an inexpensive and simple means such as a bipolar transistor. Moreover, since the intra-viewfinder LCD boosting circuit is formed on the same chip as the CPU using the CMOS that refers to an efficient manufacturing process. The whole circuit can be characterized by low cost, high precision, and a compact design.

In the aforesaid embodiments, the first power circuit 105 is of a chopper type, and the second power circuit 110 is of a charge pump type. Alternatively, the first and second power circuits may be of any other types. The first and second power circuits may have circuitries other than those employed in the embodiments.

Moreover, the camera is not limited to those of the embodiments.

Furthermore, the transmission LCD other than the external display LCD can apply to any usage other than the usage as the intra-viewfinder LCD.

As mentioned above, according to the aforesaid embodiment, there is provided a camera in which even when information is displayed within a viewfinder in a power-saving state, exhaustion of a battery can be suppressed, the information can be displayed within the viewfinder with sufficient definition, and the cost of circuits required or the space occupied by the circuits is limited.

In this invention, it is apparent that a wide range of difference working modes can be formed on the basis of the invention without a departure from the spirit and scope of the invention. This invention is not restricted to any specific embodiment but limited to the appended claims.

What is claimed is:

1. A camera having a liquid-crystal display device, the camera comprising:
    a control circuit for controlling a sequence of operations performed by said camera;
    a first power circuit for maintaining a first voltage necessary to operate said control circuit; and
    a second power circuit having a boosting function for maintaining a second voltage that is higher than the first voltage and necessary to drive said liquid-crystal display device.

2. A camera according to claim 1, wherein said second power circuit further includes means for restricting a high level of the second voltage.

3. A camera according to claim 1, wherein:
    said liquid-crystal display device includes a separate transmission liquid crystal device and a non-transmission liquid crystal device; and
    said first power circuit includes a constant voltage circuit for supplying a constant voltage to said non-transmission liquid crystal device.

4. A camera having a liquid-crystal display device, the camera comprising:
    a control circuit for controlling a sequence of operations performed by said camera;
    a first power circuit for maintaining a first voltage necessary to operate said control circuit;
    a second power circuit, having a boosting function, for maintaining a second voltage that is higher than the first voltage and necessary to drive said liquid-crystal display device; and
    strobe means, including an IGBT device, for controlling flashing;
    wherein said second voltage is used to control a gate of said IGBT device.

5. A camera according to claim 1, wherein:
    said control circuit and at least a part of said first power circuit which develops a cyclic signal for boosting are formed on different chips; and said control circuit and at least a part of said second power circuit which develops a cyclic signal for boosting are formed on a same chip.

6. A camera according to claim 5, wherein said control circuit is included in a one-chip microcomputer.

7. A camera according to claim 5, further comprising reference voltage generating means, formed in a chip different from the chip having said control circuit, for generating a reference voltage used to control the second voltage.

8. A camera according to claim 5, wherein:

said first power circuit includes a bipolar device; and said second power circuit includes a CMOS device.

9. A camera having a liquid-crystal display device, comprising:

a control circuit for controlling a sequence of operations performed by said camera;

a cyclic signal output circuit for outputting a cyclic signal used to drive said liquid-crystal display device; and a power circuit for inputting the cyclic signal from said cyclic signal output circuit, the power circuit having a boosting function for maintaining a supply voltage used to drive said liquid-crystal display device at a voltage higher than a supply voltage applied to at least one of said control circuit and said cyclic signal output circuit.

10. A camera according to claim 9, wherein the cyclic signal output from said cyclic signal output circuit is for boosting an output voltage of said power circuit.

11. A camera having a liquid-crystal display device that provides a display whose density is frequency-dependent and driving voltage-dependent, the camera comprising:

a cyclic signal output circuit for outputting a cyclic signal used to drive said liquid-crystal display device;

a power circuit for retaining a supply voltage used to drive said liquid-crystal display device within a given range of voltages, and for varying a voltage according to a sequence of operations performed by said camera;

detecting means for detecting at least one of variation of the voltage and the sequence of operations; and control means for, responsive to the detecting means, controlling a frequency of the cyclic signal according to at least one of the sequence or the voltage variation.

12. A camera having a transmission liquid crystal device and a non-transmission liquid crystal device for displaying information externally, the camera comprising:

operation member detecting means for detecting when an operation member of the camera is operated;

timing means for detecting, responsive to the operation member detecting means, when the operation member has not been operated for a first given time and for a second given time longer than the first given time; and control means for, responsive to the timing means, controlling said non-transmission liquid crystal device and said transmission liquid crystal device so that when an operation member of said camera has not been operated for the first given time, at least part of a display provided by said non-transmission liquid crystal device is turned off, and when said operation member of said camera has not been operated for the second given time, the display provided by said transmission liquid crystal device is turned off.

13. A camera according to claim 12, further comprising:

a liquid-crystal display device;

a CPU for controlling operations of the whole camera; and a voltage conversion circuit for operating in response to a pulse train, the voltage conversion circuit being connected to an external electrode of said CPU;

wherein said CPU includes a pulse generation circuit for outputting a pulse train to said external electrode, a voltage detection circuit for detecting an output voltage of said voltage conversion circuit, a voltage control circuit for controlling a pulse train to retain said output voltage at a constant value based on the detected voltage, and a liquid-crystal drive circuit for applying the output voltage to said liquid crystal display device to drive said liquid-crystal display device.

14. A camera according to claim 12, further comprising:

a liquid-crystal display device;

a CPU for controlling operations of the whole camera;

a voltage multiplication circuit, connected to an external electrode of said CPU, for boosting an input voltage to a voltage value which is an integral multiple of the input voltage and outputting the resultant voltage;

wherein said CPU includes a voltage multiplication drive circuit for driving said voltage multiplication circuit in response to a boosting start instruction, and a liquid-crystal drive circuit for applying an output of said voltage multiplication circuit to said liquid-crystal display device to drive said liquid-crystal display device.

* * * * *